United States Patent
Jiang et al.

(10) Patent No.: US 11,222,431 B2
(45) Date of Patent: Jan. 11, 2022

(54) FEATURE PROCESSING METHOD AND DEVICE FOR MOTION TRAJECTORY, AND COMPUTER STORAGE MEDIUM

(71) Applicant: China UnionPay Co., Ltd., Pudong New Area Shanghai (CN)

(72) Inventors: Danni Jiang, Pudong New Area Shanghai (CN); Dongjie He, Pudong New Area Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/258,665

(22) PCT Filed: Jul. 3, 2019

(86) PCT No.: PCT/CN2019/094475
§ 371 (c)(1),
(2) Date: Jan. 7, 2021

(87) PCT Pub. No.: WO2020/011069
PCT Pub. Date: Jan. 16, 2020

(65) Prior Publication Data
US 2021/0248760 A1    Aug. 12, 2021

(30) Foreign Application Priority Data
Jul. 11, 2018  (CN) .......................... 201810756730.2

(51) Int. Cl.
*G06K 9/00* (2006.01)
*G06T 7/246* (2017.01)
*G06T 7/90* (2017.01)

(52) U.S. Cl.
CPC ................ *G06T 7/251* (2017.01); *G06T 7/90* (2017.01); *G06T 2207/30241* (2013.01)

(58) Field of Classification Search
CPC .............. G06K 9/2054; G06K 9/4652; G06K 9/00744; G06K 9/6267; G06K 9/00718;
(Continued)

(56) References Cited

U.S. PATENT DOCUMENTS 5,281,957 A * 1/1994 Schoolman ............ G02B 30/34
345/8
5,298,919 A * 3/1994 Chang .................... G06F 3/0312
345/163
(Continued)

FOREIGN PATENT DOCUMENTS

CN    103093183 A    5/2013
CN    104463084 A    3/2015
(Continued)

OTHER PUBLICATIONS

Int'l Search Report and Written Opinion dated Oct. 8, 2019 in Int'l Application No. PCT/CN2019/094475.
(Continued)

*Primary Examiner* — Duy M Dang
(74) *Attorney, Agent, or Firm* — Panitch Schwarze Belisario & Nadel LLP

(57) ABSTRACT

A feature processing method and device for a motion trajectory, and a computer storage medium. The method may have a client device acquiring a motion trajectory generated by a user behavior to obtain an ordered point set, and each trajectory point in the ordered point set may have a position element and a time element. The method may further use information in the position element and the time element to convert the motion trajectory into an image. Furthermore, by performing image processing on the image, the method may obtain one or more feature vectors in the motion trajectory.

20 Claims, 1 Drawing Sheet

(58) Field of Classification Search
CPC ........... G06K 9/00684; G06K 2209/21; G06K 9/00778; G06K 9/00771; G06K 9/00993; G06K 9/03; G06K 9/627; G06K 9/6256; G06K 9/00671; G06K 9/6202; G06F 16/5838; G06F 16/535; G06F 16/538; G06F 16/907; G06F 16/583; G06F 16/58; G06F 16/9537; G06F 16/29; G06F 16/2264; G06F 16/9024; G06T 7/20; G06T 7/215; G06T 7/254; G06T 7/285; G06T 7/251; G06T 7/90; G06T 2207/30241; H04N 7/181
See application file for complete search history.

(56) References Cited

U.S. PATENT DOCUMENTS

| | | | |
|---|---|---|---|
| 2008/0216721 A1* | 9/2008 | Nagai | D05C 9/04 |
| | | | 112/102.5 |
| 2011/0137196 A1* | 6/2011 | Kakei | A61B 5/389 |
| | | | 600/546 |
| 2013/0057516 A1 | 3/2013 | Lu et al. | |
| 2016/0259483 A1 | 9/2016 | Baldwin | |

FOREIGN PATENT DOCUMENTS

| | | |
|---|---|---|
| CN | 106569613 A | 4/2017 |
| CN | 107133511 A | 9/2017 |
| CN | 107463878 A | 12/2017 |
| EP | 2911089 A1 | 8/2015 |
| JP | 2015135537 A | 7/2015 |
| JP | 201671777 A | 5/2016 |
| JP | 20174298 A | 1/2017 |
| KR | 20100089620 A | 8/2010 |
| KR | 20160124779 A | 10/2016 |
| WO | 2017061758 A1 | 4/2017 |

OTHER PUBLICATIONS

Int'l Search Report and Written Opinion dated Oct. 8, 2019 in Int'l Application No. PCT/CN2019/094475 (Translation).
Office Action dated Apr. 22, 2021 in Japanese Application No. 2020-554890.
Office Action dated Apr. 3, 2021 in Korean Application No. 10-2020-7032005.

* cited by examiner ly and experientially defined or functional approximation and curve fitting is performed on the motion trajectory. However, such technical solutions are defective for the following problems: (1) since the rules for extracting features of the motion trajectory are set artificially, the quality of the extracted features essentially depends on the prior knowledge of human, and the rules has no universality because of their strong relation with the scenario; (2) due to complex structural features of the motion trajectory, the existing solutions, which adopt the discrete statistics such as the mean and variance of kinematic variables (for example, velocity, acceleration, displacement, etc.), only describe the features of the motion trajectory in a one-sided way, and thus abundant implicit information that is difficult to express is lost in the modeling process; and (3) effects of the solution using the functional approximation and curve fitting are unstable, because it is difficult to select a suitable curve type, and the error caused by abnormal points to the curve fitting is significant. Moreover, the motion trajectory may not certainly be abstracted with a suitable function, and over-fitting easily happens.

FEATURE PROCESSING METHOD AND DEVICE FOR MOTION TRAJECTORY, AND COMPUTER STORAGE MEDIUM

CROSS-REFERENCE TO RELATED APPLICATION

This application is a Section 371 of International Application No. PCT/CN2019/094475, filed Jul. 3, 2019, which was published in the Chinese language on Jan. 16, 2020 under International Publication No. WO 2020/011069 A1, which claims priority under 35 U.S.C. § 119(b) to Chinese Patent Application No. 201810756730.2, filed Jul. 11, 2018, the disclosures of which are incorporated herein by reference.

TECHNICAL FIELD

The present disclosure relates to a computer data processing field, in particular, to a method and device for processing a feature of a motion trajectory, and a computer storage medium.

BACKGROUND

Unlike automatic operations of a machine, motion trajectories due to human behaviors, such as using a mouse, dragging a slider or the like, have inherent biological features, and thereby are applicable in human-machine verification and risk identification.

In the prior art, especially in the field of human-machine identification and module-sliding verification, according to the existing solutions, typically rules for extracting features of the motion trajectory are artificially and experientially defined or functional approximation and curve fitting is performed on the motion trajectory. However, such technical solutions are defective for the following problems: (1) since the rules for extracting features of the motion trajectory are set artificially, the quality of the extracted features essentially depends on the prior knowledge of human, and the rules has no universality because of their strong relation with the scenario; (2) due to complex structural features of the motion trajectory, the existing solutions, which adopt the discrete statistics such as the mean and variance of kinematic variables (for example, velocity, acceleration, displacement, etc.), only describe the features of the motion trajectory in a one-sided way, and thus abundant implicit information that is difficult to express is lost in the modeling process; and (3) effects of the solution using the functional approximation and curve fitting are unstable, because it is difficult to select a suitable curve type, and the error caused by abnormal points to the curve fitting is significant. Moreover, the motion trajectory may not certainly be abstracted with a suitable function, and over-fitting easily happens.

The information disclosed in this section of the present disclosure is only for better understanding of the general background of the disclosure and should not be taken as an acknowledgement or any form of suggestion that this information forms the prior art already known to a person skilled in the art.

SUMMARY

To solve one or more defects in the prior art, according to one aspect of the present disclosure, a method for processing a feature of a motion trajectory is provided, and the method includes: collecting by a client device a motion trajectory due to a user behavior to obtain a set of sequential trajectory points, where each trajectory point in the set of sequential trajectory points includes a position element and a time element; converting the motion trajectory into an image based on information in the position element and the time element; and obtaining one or more feature vectors in the motion trajectory by performing image processing on the image.

In the method, the motion trajectory due to the user behavior may include a mouse motion trajectory or a motion trajectory generated by touching on a screen.

In the method, an nth trajectory point in the set of sequential trajectory points may be represented by $[x_n, y_n, t_n]$, where $x_n$ denotes a horizontal coordinate, $y_n$ denotes a vertical coordinate, and $t_n$ denotes time.

In the method, the converting the motion trajectory into the image based on the information in the position element and the time element includes: drawing the motion trajectory according to the position element and the time element of each trajectory point in the set of sequential trajectory points; and mapping the drawn motion trajectory to an image represented by at least one image channel value.

In the method, the trajectory points are drawn in a given coordinate axis area according to the respective position elements, and connecting lines between the trajectory points are drawn according to the sequence of the respective time elements to thereby draw the motion trajectory.

In the method, the converting the motion trajectory into the image based on the information in the position element and the time element further includes: smoothing and enhancing the drawn motion trajectory to enrich feature information before the mapping.

In the method, a velocity in a direction of horizontal axis x, a velocity in a direction of vertical axis y and time of the drawn motion trajectory are extracted and then mapped and transformed into a value range of [0, 255] to obtain RGB image channel values for representing the image.

In the method, the RGB image channel values of points in the image which are not passed through by the motion trajectory are set as 0.

The method further includes performing human-machine identification or verification according to the one or more feature vectors.

The method further includes: acquiring operation environment data; and performing the human-machine identification or verification according to the one or more feature vectors and the operation environment data.

According to another aspect, the present disclosure provides a device for processing a feature of a motion trajectory, and the device includes: a collecting unit, configured to collect a motion trajectory due to a user behavior to obtain a set of sequential trajectory points, where each trajectory point in the set of sequential trajectory points includes a position element and a time element; a converting unit, configured to convert the motion trajectory into an image based on information in the position element and the time element; and a processing unit, configured to perform image processing on the image to obtain one or more feature vectors in the motion trajectory.

In the device, the motion trajectory due to the user behavior includes a mouse motion trajectory or a motion trajectory generated by touching on a screen.

In the device, an nth trajectory point in the set of sequential trajectory points is represented by $[x_n, y_n, t_n]$, where $x_n$ denotes a horizontal coordinate, $y_n$ denotes a vertical coordinate, and $t_n$ denotes time.

In the device, the converting unit is configured to draw the motion trajectory according to the position element and the time element of each trajectory point in the set of sequential trajectory points, and map the drawn motion trajectory to an image represented by at least one image channel value.

In the device, the converting unit is configured to draw the trajectory points in a given coordinate axis area according to the respective position elements, and draw connecting lines between the trajectory points according to the sequence of the respective time elements to thereby draw the motion trajectory.

In the device, the converting unit is configured to smooth and enhance the drawn motion trajectory to enrich feature information before the mapping.

In the device, the converting unit is configured to extract a velocity in a direction of horizontal axis x, a velocity in a direction of vertical axis y and time of the drawn motion trajectory, and map and transform the extracted velocities and time into a value range of [0,255] to obtain RGB image channel values for representing the image.

In the device, the converting unit is further configured to set the RGB image channel values of points in the image which are not passed through by the motion trajectory as 0.

The device further includes a first identifying unit configured to perform human-machine identification or verification according to the one or more feature vectors.

The device further includes: an acquiring unit, configured to acquire operation environment data; and a second identifying unit, configured to perform the human-machine identification or verification according to the one or more feature vectors and the operation environment data.

According to still another aspect, the present disclosure provides a computer storage medium including instructions that, when executed, cause a processor to perform the aforesaid method.

The feature processing solution according to the present disclosure does not depend on the prior knowledge of human but has a strong universality. By converting the motion trajectory into an image as an input, the rules for extracting the features of the motion trajectory, such as jitter and displacement features, are no longer designed artificially, avoiding the problems of impropriety in feature modeling and incompleteness in consideration. Furthermore, the image-based feature modeling method according to the present disclosure retains the original structure information of the motion trajectory and other implicit information difficult to describe with rules. The features after the process of the inventive solution are suitable for various advanced image processing and deep learning algorithms (such as Convolutional Neural Network (CNN)), in addition to the traditional machine learning algorithms, thereby expanding the application range of trajectory feature models. Moreover, by adopting the feature processing solution of the present disclosure, it is difficult for an attacker to discover the rules used in the human-machine identification or verification, so that it is impossible to simulate normal human operations in batches to deceive the risk control engine.

Other features and advantages of the method and device of the present disclosure will become apparent or clarified more specifically through accompanying drawings incorporated herein and subsequent specific implementations used together with the accompanying drawings to illustrate certain principles of the present disclosure.

DETAILED DESCRIPTION OF THE EMBODIMENTS

The following description describes specific embodiments of the present disclosure to teach those skilled in the art how to make and use the best mode of the present disclosure. For the purpose of teaching inventive principles, some conventional aspects have been simplified or omitted. Those skilled in the art will appreciate that variations from these embodiments fall within the scope of the disclosure. Those skilled in the art will appreciate that the features described below may be combined in various ways to form multiple variations of the disclosure. As a result, the present disclosure is not limited to the specific embodiments described below, but only by the claims and their equivalents.

Figure 1:
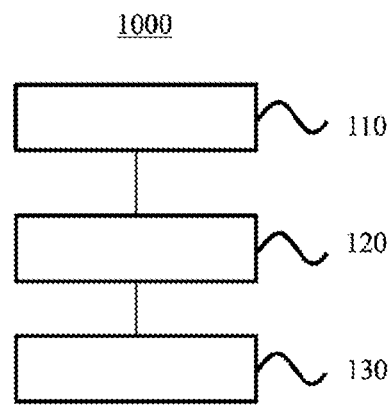
FIG. 1 illustrates a method for processing a feature of a motion trajectory according to an embodiment of the present disclosure.

FIG. 1 illustrates a method 1000 for processing a feature of a motion trajectory according to an embodiment of the present disclosure. As shown in FIG. 1, the method 1000 includes the following steps:

Step 110: collecting by a client device a motion trajectory due to a user behavior to obtain a set of sequential trajectory points, where each trajectory point in the set of sequential trajectory points includes a position element and a time element;

Step 120: converting the motion trajectory into an image based on information in the position element and the time element; and Step 130: obtaining one or more feature vectors in the motion trajectory by performing image processing on the image.

In the context of the present disclosure, the term "motion trajectory due to a user behavior" may include a mouse motion trajectory or a motion trajectory generated by touching on a screen.

In an embodiment, a sample of the motion trajectory sampled by the client device is represented by a set of sequential trajectory points, such as [[$x_1$, $y_1$, $t_1$], [$x_2$, $y_2$, $t_2$], . . . , [$x_n$, $y_n$, $t_n$]], where the nth trajectory point is represented by [$x_n$, $y_n$, $t_n$], $x_n$ denotes its horizontal coordinate, $y_n$ denotes its vertical coordinate, and $t_n$ denotes its time. The time herein may be represented by a processed relative value and satisfies: $t_1=0$, $t_i=t_{i-1}+\Delta t$ (where i is an integer lager than 1), where $\Delta t$ is the time interval between the sampled trajectory points. The size of the image is determined by the maxima and minima of the horizontal and vertical coordinates of the motion trajectory, that is, the image has a length of $x_{max}$-$x_{min}$ and a width of $y_{max}$-$y_{min}$, and the respective trajectory points are connected by lines in the sequence of $t_1 t_2 \ldots t_n$.

In the above embodiment, the image boundary is determined by the maxima and minima of the horizontal and vertical coordinates of the motion trajectory. Alternatively, in another embodiment, the image boundary may be determined according to the resolution of the client device, and the coordinate values of the motion trajectory depend on the setting of the coordinate system. For example, in the case where the resolution of the user's screen is 1600*900 and the rows and columns of the pixel matrix conforms to a ratio of 4 to 3, if the origin of the coordinate system is located at the center of the screen, then the horizontal and vertical coordinate boundaries of the motion trajectory are X [−800, 800] and Y [−450, 450], respectively. In addition, it will be easily appreciated by those skilled in the art that the sampling density of the motion trajectory may be appropriately increased or decreased according to requirements on the verification accuracy in different scenarios or the limitation by conditions of the client hardware devices.

In an embodiment, the converting the motion trajectory into the image based on the information in the position element and the time element of the trajectory points includes: drawing each trajectory point in the set of sequential trajectory points according to the position element and the time element of the motion trajectory; and mapping the drawn motion trajectory to an image represented by at least one image channel value. For example, the trajectory points are drawn in a given coordinate axis area according to the coordinates of the trajectory points from the set of trajectory points of the sampled motion trajectory, and connecting lines between the trajectory points are drawn according to a chronological order of the trajectory points to thereby draw the motion trajectory. The simplest case is to construct a matrix of pixel points having a value of 0 or 1, where the pixel point in the image through which the motion trajectory passes has a value of 1, and the pixel point in the image through which the motion trajectory does not pass has a value of 0.

In an embodiment, the converting the motion trajectory into the image based on the information in the position element and the time element further includes: smoothing and enhancing the drawn motion trajectory to enrich feature information before the mapping. For example, the motion trajectory may be smoothed and enhanced by various manners, such as simple averaging, median filtering, Gaussian smoothing and the like, to enrich the feature information. After the processing, each motion trajectory is converted into a pixel matrix which stores trajectory structural features and motion features and is thereby suitable for various advanced algorithm models.

In an embodiment, other information is added in a form of image channels to the motion trajectory. The velocities in the horizontal and vertical directions and time of the trajectory points are mapped to integers in the interval of [0, 255], and the information in each dimension (i.e. each of the velocities and time) represents an image channel value. A single-channel or multi-channel image is established as needed. Each pixel of the single-channel image only needs one dimension of information and thus the single-channel image may be a grayscale image, whereas the three-channel image is in an RGB mode and is namely a color image.

For example, the velocity in the direction of horizontal axis x, the velocity in the direction of vertical axis y, and the time are selected as the RGB channel information. The velocity of the $i^{th}$ point in the direction of horizontal axis x has an approximate value of:

$$v_{xi}=x_{i+1}-x_{i-1}/t_{i+1}-t_{i-1}$$

Similarly, the velocity of the $i^{th}$ point in the direction of vertical axis y has an approximate value of:

$$v_{yi}=y_{i+1}-y_{i-1}/t_{i+1}-t_{i-1}$$

The RGB channel values of each trajectory point are obtained by mapping the value ranges of the velocity in the direction of horizontal axis x, of the velocity in the direction of vertical axis y, and of the time to the interval [0, 1] by using a min-max normalization method, and then multiplying the normalized values of the velocities and time by 255 to transform the value ranges to the interval [0,255]. The points in the image which are not passed through by the trajectory are set as R=G=B=0.

Of course, it will be appreciated by those skilled in the art that other information may be adopted as the channel information. The above embodiment takes the velocities in the directions of horizontal and vertical axes x and y and the time as the RGB channel information. In other embodiments, other combinations, such as the acceleration in the directions of horizontal and vertical axes x and y and time $(a_{xi}, a_{yi}, t_i)$, or velocity, acceleration, and time $(v_i, a_i, t_i)$, may be adopted and transformed as the RGB channel information, where the acceleration of the $i^{th}$ point in the direction of horizontal axis x is represented by:

$$a_{xi}=v_{xi}+v_{x(i-1)}/t_i-t_{i-1}$$

the acceleration of the $i^{th}$ point in the direction of vertical axis y is represented by:

$$a_{yi}=v_{yi}+v_{y(i-1)}/t_i-t_{i-1}$$

and the acceleration of the $i^{th}$ point is represented by:

$$a_i=\sqrt{a_{xi}^2+a_{yi}^2}$$

Furthermore, in addition to the min-max normalization algorithm, other normalization methods such as Z-score may be employed as the normalization method.

In an embodiment, the method 1000 for processing a feature of a motion trajectory may further include performing human-machine identification or verification according to the one or more feature vectors. In another embodiment, the method 1000 for processing a feature of a motion trajectory may further include acquiring operation environment data, and performing the human-machine identification or verification according to the one or more feature vectors and the operation environment data.

In addition to behavioral features such as motion trajectories of the user operation, the operation environment data in the process of human-machine identification and verification also has a certain value. The attribute information like the operation environment may be encoded and mapped, and the category information may be encoded and converted into a numerical form to serve as a supplementary feature of the sample. In an embodiment, a numeral is assigned to each category in the attribute information. For example, in the case of the attribute of the operating system, the assignment may be Windows 7: 0, Ubuntu: 1, . . . . However, such a manner may sometimes sort the category information naturally. For example, it may be deemed as Ubuntu>Windows7 in the aforesaid example.

In an embodiment, a one-hot encoding method may be adopted to convert an attribute into n categories of features, where n refers to the number of categories. For example, assuming that the operating system is classified into four categories, i.e. Windows7, Ubuntu, IOS, and Android, the corresponding code may be: x1[Windows7]=1000, x2[Ubuntu]=0100, x3[IOS]=0010, and x4[Android]=0001.

Figure 2:
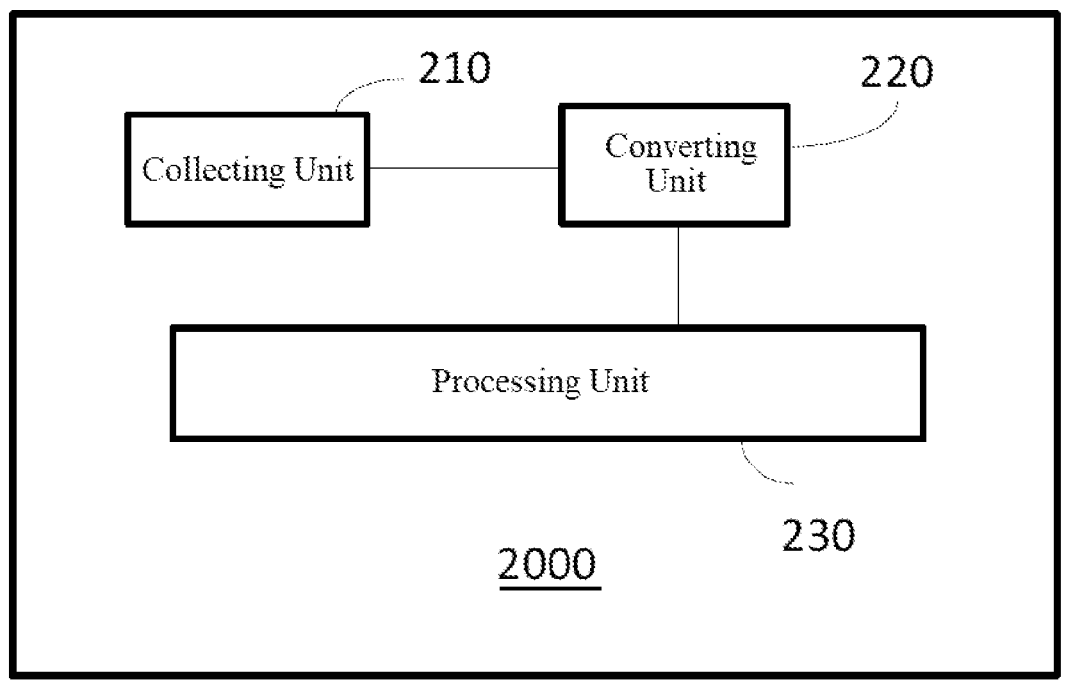
FIG. 2 illustrates a device for processing a feature of a motion trajectory according to an embodiment of the present disclosure.

FIG. 2 illustrates a device 2000 for processing a feature of a motion trajectory according to an embodiment of the present disclosure. As shown in FIG. 2, the device 2000 includes a collecting unit 210, a converting unit 220, and a processing unit 230. The collecting unit 210 is configured to collect a motion trajectory due to a user behavior to obtain a set of sequential trajectory points, where each trajectory point in the set of sequential trajectory points includes a position element and a time element. The converting unit 220 is configured to convert the motion trajectory into an image based on information in the position element and the time element. The processing unit 230 is configured to perform image processing on the image to obtain one or more feature vectors in the motion trajectory.

In an embodiment, the converting unit 220 is configured to draw the motion trajectory according to the position element and the time element of each trajectory point in the set of sequential trajectory points, and map the drawn motion trajectory to an image represented by at least one image channel value. In another embodiment, the converting unit 220 is configured to draw the trajectory points in a given coordinate axis area according to the respective position elements, and draw connecting lines between the trajectory points according to the sequence of the respective time elements to thereby draw the motion trajectory. In still another embodiment, the converting unit 220 is configured to smooth and enhance the drawn motion trajectory before the mapping to enrich feature information. In still another embodiment, the converting unit 220 is configured to extract a velocity in a direction of horizontal axis x, a velocity in a direction of vertical axis y and time of the drawn motion trajectory, and then map and transform the extracted velocities and time into a value range of [0,255] to obtain RGB image channel values for representing the image. In still another embodiment, the converting unit 220 is further configured to set the RGB image channel values of points in the image which are not passed through by the motion trajectory to be 0.

In an embodiment, the device 2000 may further include a first identifying unit (not shown) configured to perform human-machine identification or verification according to the one or more feature vectors. In another embodiment, the device 2000 may further include: an acquiring unit configured to acquire operation environment data; and a second identifying unit configured to perform the human-machine identification or verification according to the one or more feature vectors and the operation environment data.

It should be noted that the aforesaid method and device for processing a feature of a motion trajectory are described in detail with human-machine identification or verification as the application scenario. It will be appreciated by those skilled in the art that the aforesaid method and device may be applied to other human-computer interaction scenarios without substantial changes.

Those skilled in the art should understand that the embodiments of the present disclosure may be provided as a method, a system, or a computer program product. Accordingly, the present disclosure may adopt the form of hardware, software, or a combination of hardware and software. Moreover, the present disclosure may be in the form of a computer program product that is implemented on one or more computer-usable storage medium (including, without limitation, magnetic disk storage and optical storage) containing computer-usable program codes. For example, the computer program instructions may be provided to the processor of a general-purpose computer, a special-purpose computer, an embedded processor, or other editable processing equipment to thereby generate an instruction sequence for performing the specified operations.

In summary, the feature processing solution according to the present disclosure does not depend on the prior knowledge of human but has a strong universality. By converting the motion trajectory into an image as an input, the rules for extracting features of the motion trajectory, such as jitter and displacement features, are no longer designed artificially, avoiding the problems of impropriety in feature modeling and incompleteness in consideration. Furthermore, the image-based feature modeling method according to the present disclosure retains the original structure information of the motion trajectory and other implicit information difficult to describe with rules. The features after the process of the inventive solution are suitable for various advanced image processing and deep learning algorithms (such as Convolutional Neural Network (CNN)), in addition to the traditional machine learning algorithms, thereby expanding the application range of trajectory feature models. Moreover, by adopting the feature processing solution of the present disclosure, it is difficult for an attacker to discover the rules used in the human-machine identification or verification, so that it is impossible to simulate normal human operations in batches to deceive the risk control engine.

The aforesaid examples mainly serve to illustrate the method and device for processing a feature of a motion trajectory and the computer storage medium of the present disclosure. Although only some of the specific embodiments of the present disclosure have been described, those skilled in the art should understand that the present disclosure may be implemented in many other forms without departing from the spirit and scope. Thus, examples and implementations as shown are illustrative rather than restrictive, and the present disclosure may cover various modifications and substitutions without departing from the spirit and scope of the present disclosure as defined by the appended claims.

What is claimed is:

1. A method for processing a feature of a motion trajectory, comprising:
    collecting by a client device a motion trajectory due to a user behavior to obtain a set of sequential trajectory points, wherein each in the set of sequential trajectory points comprises a position element and a time element;
    converting the motion trajectory into an image based on information in the position element and the time element; and
    obtaining one or more feature vectors in the motion trajectory by performing image processing on the image.

2. The method of claim 1, wherein the motion trajectory due to the user behavior comprises a mouse motion trajectory or a motion trajectory generated by touching on a screen.

3. The method of claim 1, wherein an nth trajectory point in the set of sequential trajectory points is represented by $[x_n, y_n, t_n]$, wherein $x_n$ denotes a horizontal coordinate, $y_n$ denotes a vertical coordinate, and $t_n$ denotes time.

4. The method of claim 1, wherein the converting motion trajectory into the image based on the information in the position element and the time element comprises:
    drawing the motion trajectory according to the position element and the time element of each in the set of sequential trajectory points; and
    mapping the drawn motion trajectory to an image represented by at least one image channel value.

5. The method of claim 4, wherein the trajectory points are drawn in a given coordinate axis area according to the respective position elements, and connecting lines between the trajectory points are drawn according to the sequence of the respective time elements to thereby draw the motion trajectory.

6. The method of claim 4, wherein the converting the motion trajectory into the image based on the information in the position element and the time element further comprises:
    smoothing and enhancing the drawn motion trajectory to enrich feature information before the mapping.

7. The method of claim 4, wherein a velocity in a direction of horizontal axis x, a velocity in a direction of vertical axis y and time of the drawn motion trajectory are extracted and then mapped and transformed into a value range of [0, 255] to obtain RGB image channel values for representing the image.

8. The method of claim 7, wherein RGB image channel values of points in the image which are not passed through by the motion trajectory are set as 0.

9. The method of claim 1, further comprising:
performing human-machine identification or verification according to the one or more feature vectors.

10. The method of claim 1, further comprising:
acquiring operation environment data; and
performing human-machine identification or verification according to the one or more feature vectors and the operation environment data.

11. A non-transitory computer storage medium comprising instructions that, when executed, cause a processor to perform the method according to claim 1.

12. A device for processing a feature of a motion trajectory, comprising:
a collecting unit, configured to collect a motion trajectory due to a user behavior to obtain a set of sequential trajectory points, wherein each in the set of sequential trajectory points comprises a position element and a time element;
a converting unit, configured to convert the motion trajectory into an image based on information in the position element and the time element; and
a processing unit, configured to perform image processing on the image to obtain one or more feature vectors in the motion trajectory.

13. The device of claim 12, wherein an nth trajectory point in the set of sequential trajectory points is represented by $[x_n, y_n, t_n]$, wherein $x_n$ denotes a horizontal coordinate, $y_n$ denotes a vertical coordinate, and $t_n$ denotes time.

14. The device of claim 12, wherein the converting unit is configured to draw the motion trajectory according to the position element and the time element of each trajectory point in the set of sequential trajectory points, and map the drawn motion trajectory to an image represented by at least one image channel value.

15. The device of claim 14, wherein the converting unit is configured to draw the trajectory points in a given coordinate axis area according to the respective position elements, and draw connecting lines between the trajectory points according to the sequence of the respective time elements to thereby draw the motion trajectory.

16. The device of claim 14, wherein the converting unit is configured to smooth and enhance the drawn motion trajectory to enrich feature information before the mapping.

17. The device of claim 14, wherein the converting unit is configured to extract a velocity in a direction of horizontal axis x, a velocity in a direction of vertical axis y and time of the drawn motion trajectory, and map and transform the extracted velocities and time into a value range of [0, 255] to obtain RGB image channel values for representing the image.

18. The device of claim 17, wherein the converting unit is further configured to set RGB image channel values of points in the image which are not passed through by the motion trajectory as 0.

19. The device of claim 12, further comprising:
a first identifying unit, configured to perform human-machine identification or verification according to the one or more feature vectors.

20. The device of claim 12, further comprising:
an acquiring unit, configured to acquire operation environment data; and
a second identifying unit, configured to perform human-machine identification or verification according to the one or more feature vectors and the operation environment data.

* * * * *